June 21, 1960 R. V. GANZ 2,941,277
METHOD OF MAKING CASTING MOLDS FOR CERAMIC FORMS
Filed April 30, 1956
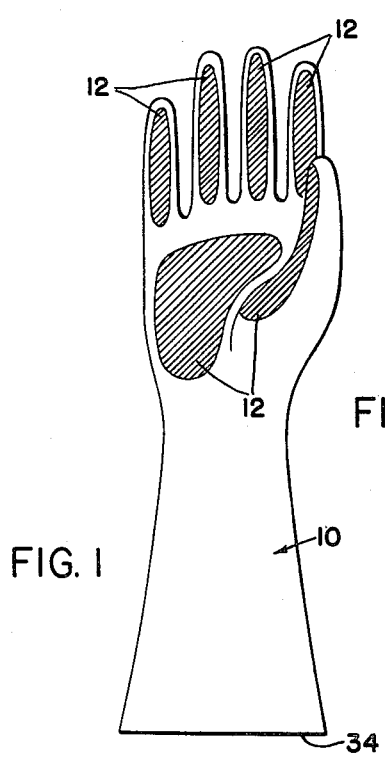
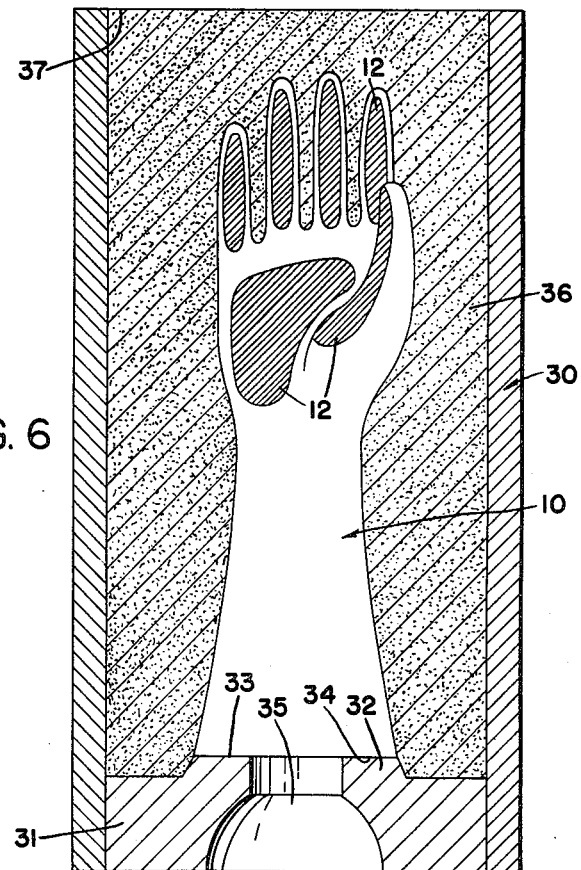
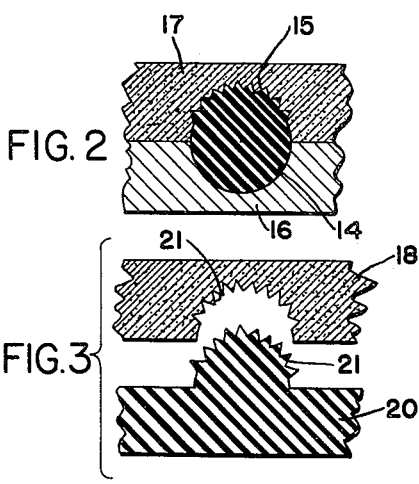
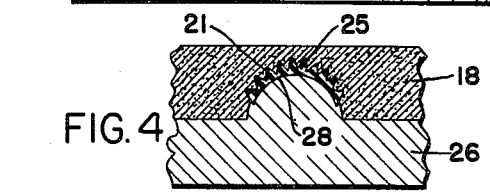
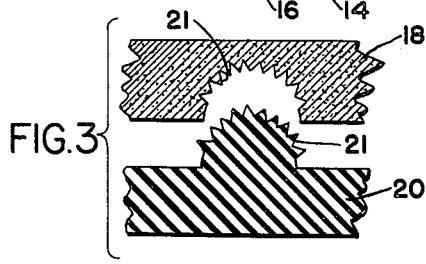
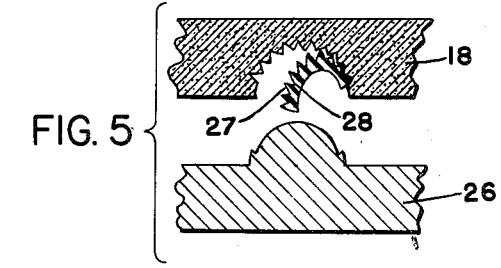
INVENTOR.
RUDOLPH V. GANZ
BY Willis F. Avery
ATTORNEY

United States Patent Office 2,941,277
Patented June 21, 1960

2,941,277

METHOD OF MAKING CASTING MOLDS FOR CERAMIC FORMS

Rudolph V. Ganz, 3025 Silver Lake Blvd., Cuyahoga Falls, Ohio

Filed Apr. 30, 1956, Ser. No. 581,561

3 Claims. (Cl. 25—156)

This invention relates to the method of making a master casting mold for the production of ceramic forms, such as the porcelain forms used in the manufacture of thin rubber and plastic products by dipping the ceramic form into a liquid dispersion of rubber or other plastic, whether an organosol or a plastisol, and particularly to a method of making a master casting mold for the production of hollow porcelain dipping forms having various patterns or designs, whether ornamental or utilitarian, or both, in surface areas of the dipping form integral with and formed at the same time as the dipping form is cast within the casting mold.

It is an object of this invention to make a master casting mold in which a dipping form bearing a predetermined surface design may be produced and also to make a dipping form which is a duplicate of a model, the dipping form having on certain surface areas predetermined designs.

Ceramic or porcelain hollow dipping forms are normally produced by filling a solid porous master casting mold with a flowable clay slip or slurry, the casting mold being preferably highly pervious to air and to water, so that the water in the liquid clay slurry at the inner surface of the casting mold may readily displace the air in the porous casting mold and be absorbed into the interstices or pores of the water-absorbent porous casting mold so as to leave a self-sustaining layer of clay contiguous to the inner surface of the porous casting mold. Generally, the longer the clay slurry is within the pervious water-absorbent casting mold, or the greater the pressure differential between the slurry within the casting mold and the atmosphere outside the casting mold, the greater the thickness and density of the self-sustaining layer deposited on the inner surface of the mold. When the self-sustaining clay layer has attained a desired thickness, the surplus clay slurry is removed from the casting mold leaving a self-sustaining clay layer within the porous casting mold.

Generally, the porous highly water-absorbent master casting mold is constructed in two or more sections, so that the mold may be opened to remove the self-sustaining clay form from the casting mold as an integral unit, which constitutes the dipping form. The green dipping form is allowed to dry, given a glazing coating and then baked in an oven to produce a hard, firm, smooth surfaced dipping form.

This invention is directed to the making of a porous air- and water-pervious, water-absorbent master casting mold for the production of dipping forms in the manner above described. It has for an object to produce a master casting mold having an inner casting surface with debossed surface portions formed integrally therein and at the same time that the water-absorbent master casting mold is formed, so as to produce a substantially uniformly water-absorbent master casting mold at all the inner surface area portions of the casting mold, and hence in turn to provide a porous master casting mold in which dipping forms of superior quality, with debossed surface area portions integral, and formed at the same time as the dipping form itself, are produced.

In the drawings, one embodiment of the invention of this application is illustrated. It is to be understood, however, that the invention is not limited to the making of any particular casting mold but is of general application in the manufacture of casting molds.

Fig. 1 is a front elevation of the model to which flexible sheet patches have been attached;

Figs. 2 to 5 are fragmentary sectional views illustrating the making of the flexible sheet patches; and Fig. 6 is a sectional view of the master casting form disposed in the frame in which it is cast.

To accomplish the purposes of this invention, namely, to produce a porous master water-absorbent casting mold in which may be cast hollow ceramic dipping forms having surface portions of a desired pattern, a replica of the dipping form is first made of a size, shape and surface designs that are to be present in the finished dipping form. In other words, a replica of the dipping form is first made by attaching to a model or basic form 10 thin flexible sheet patches 12 at positions on the model 10 corresponding to the gripping non-slip surface areas of the glove to be made on the dipping forms which are to be cast in the porous air- and water-pervious, water-absorbent master casting mold of the invention of this application. The model 10 may be made of any suitable material, whether of metal, wood, ceramic, a plastic, plaster of Paris or other material, and where the shape of or design on the surface of the model is such as to embody undercut portions, it may be preferable to employ a flexible yieldable material or molding dough, such as is commonly used for the making of flexible models. However, for many purposes, the model may be made of a rigid non-flexible material.

To selected surface areas of the model 10 are attached thin flexible sheet patches 12 having one side smooth and the other side having a roughened embossed, debossed or otherwise figured surface, which surface areas may be made in any suitable manner, as by applying to the said roughened side of patch 12 any desired protruded and/or depressed pattern, such as will give to the end product figured or non-slipping surface areas. The term "roughened surface," occurring in the specification and the claims hereof is used in a generic sense to include any embossed and/or debossed surfaces forming any protruded or depressed figured or over-all pattern.

The patches 12 may be cut to a desired size from a relatively thin plastic sheet which has been formed with the above indicated smooth and roughened surfaces. Preferably, these thin sheet patches 12 are molded individually to the size and shape desired, the shape of each patch being such that the smooth side of the patch has a contour that is substantially that of the portion of the model 10 to which the patch is to be attached.

As shown in Figs. 2 to 5, each of the various patches 12 is individually molded to the desired size and shape. This may be accomplished by providing a form of a size and shape of that part of the model 10 to which the patch 12 is to be attached and then making a plastic cast of so much of the part as is needful to produce patch 12. Thus, in Fig. 2, a plastic or rubber-like form 14, having the desired design 15 is associated with a supporting cradle 16 and plaster of Paris or other casting material 17 is cast about the form 14, so as to produce a patch mold 18, when the casting material 17 has set. Alternatively, a flexible form 20 (Fig. 3) such as a rubber element, having a surface design 21 of desired size and shape may serve as a form about which to cast a patch mold 18. As shown in Fig. 3, when the flexible form 20 is removed from the patch mold 18, it leaves the design 21 debossed in the patch mold 18.

Having made a patch mold 18, a flexible plastic sheet 25, as a thin sheet of vulcanizable rubber, is inserted in the patch mold 18, compressed into the roughened surface 21, as by mold section 26, and vulcanized, thus setting in the surface contacting the patch mold 18 the roughened surface of the mold surface 21. Upon opening the patch mold 18 (Fig. 5), the patch 12 with the roughened surface design 27 and a smooth back 28, shaped to conform to the contour of the part of the model 10 to which it is to be attached, is removed and ready for attachment to model 10.

As shown in Fig. 1, six patches 12 of differing sizes and shapes are attached to the model 10. The attachment may be accomplished in any suitable way, as by a weak adhesive strong enough to hold the patch 12 in place during the casting of the master casting mold.

The model 10 with its patches 12, a replica of the dipping form to be used in the manufacture of thin dipped plastic articles, is next supported in a casting frame 30, as by resting on a preformed base member 31 disposed in the lower end of the casting frame 30, the base member 31 having a centrally disposed inwardly protruding portion 32 with an upper surface 33 of a size and shape of the base 34 of the model 10. The base member 31 may have a centrally disposed opening 35 therethrough, for purposes later to be described.

A suitable setting slurry, as for example plaster of Paris, is utilized to produce a multi-section master casting mold 36 of a material which is air- and water-pervious and water-absorbent.

As it is important that every detail of the model 10 with its patches 12 be reproduced free of air pockets or pin holes, it has been found to be advantageous to spray onto the model 10, prior to placing it into the casting frame 30, a coating of the flowable plaster slurry from which the casting mold 36 is to be made, and then to place the model 10 so coated into the casting frame 30, as shown in Fig. 6. It is to be understood, however, that it is not necessary first to spray coat the model 10 and that the casting mold 36 may be made in as many sections as may be desirable. Where the model 10 is made of a flexible plastic, the casting mold may be made of one piece, since the model 10 may be removed by first removing base member 31 from the frame 30 and then pulling the flexible plastic model out through the bottom of the frame.

Since the processes of making caster casting molds, both as integral castings and as sectional castings, are well known in the art, and per se form no part of this invention, a detailed description of such processes is believed to be unnecessary.

Upon removing the model 10 from the casting mold 36, should the patches 12 adhere to the casting mold 36, they should be removed from the inner surface of the hollow casting mold at this point in order to leave the impression of the designs molded on and integral with the inner surfaces of the casting mold 36.

The air- and moisture-pervious water-absorbent master casting mold 36, preferably having a base member of a size and shape of base member 31, and which may in practice be the base member 31 of the casting frame 30, is then inverted and set upon the end 37 of the master casting form 36, ready for the production of the dipping form.

Dipping forms are produced or, as commonly called in the trade, cast by introducing a clay slip or slurry of a type normally employed in the manufacture of ceramic dipping forms, into the cavity of the inverted master mold 36, as through the opening 35 in the member 31. When the cavity of the master casting mold 36 has been completely filled with the clay slip, the latter may be maintained within the cavity of the master casting mold 36 under a pressure of from about 10 to 15 pounds per square inch, or the clay slip may be permitted to remain in the casting mold 36 a longer time without any super atmospheric pressure. In either event, when a sufficiently thick self-sustaining layer has been built up on the inner surfaces of the master casting mold 36, the remaining liquid clay slurry is withdrawn from, or poured out of, the cavity in the master casting mold 36, as through opening 35, and the green dipping form converted into a baked ceramic dipping form by means well known in the art and which, per se, form no part of this invention.

Numerous variations and modifications of the method herein described may be made without departing from the spirit and scope of this invention as defined in the appended claims.

What is claimed is:

1. The method of producing an air- and water-pervious, water-absorbent master casting mold in which may be repeatedly cast from a flowable clay slurry a generally smooth ceramic glove dipping form having a roughened surface area on a selected surface area of said glove dipping form corresponding to a gripping non-slip surface area of a glove to be made on the glove dipping form by dipping in a flowable plastic liquid, which method comprises making a replica of the glove dipping form to be cast in the master casting mold by first constructing a basic form of substantially the size and shape of the said glove dipping form and having a generally smooth exterior surface; then molding a thin plastic sheet patch smooth on one side and having a roughened molded surface on the other side and molded to a size and shape of the area of the basic form to which the patch is to be attached; attaching the said preshaped molded patch to the predetermined surface of the basic form with the smooth side of the patch in adhesive contact with the said surface of the basic form to complete the replica; then casting around said completed replica from a flowable self-setting slurry of a composition which sets to an air- and water-pervious, water-absorbent solid to produce a master casting mold; removing the replica from the master casting mold thus produced; whereby an air- and water-pervious, water-absorbent master casting mold is produced in which may be repeatedly cast a ceramic glove dipping form which is a duplicate of the said replica.

2. The method of producing an air- and water-pervious, water-absorbent master casting mold in which may be repeatedly cast from a flowable clay slurry a generally smooth ceramic glove dipping form having a predetermined roughened surface area on a surface of the said glove dipping form corresponding to a non-slip surface of the glove to be made on said glove dipping form, which method comprises making a replica of the glove dipping form to be cast in the master mold by first constructing a basic form of substantially the size and shape of the said glove dipping form and having a generally smooth exterior surface; then molding a thin plastic sheet patch smooth on one side and having a molded roughened pattern on the other side and molded to the size and shape of the surface of the basic form to which the patch is to be attached; attaching the said premolded patch to the said predetermined area of the said basic form with the smooth side of the patch in adhesive contact with the smooth exterior surface of the basic form to complete the replica; applying to the completed replica a surface coating of a flowable self-setting slurry of a composition of the type which sets to an air- and water-pervious water-absorbent solid; then casting around the aforesaid coated replica from the same flowable self-setting slurry an air- and water-pervious solid to produce a master casting mold; and removing the replica including the patch from the casting mold thus produced; whereby an air- and water-pervious, water-absorbent master casting mold is produced in which may be repeatedly cast a plurality of ceramic glove dipping forms which are duplicates of the said replica.

3. The method of producing a porous, air- and water-pervious, water-absorbent master casting mold in which may be repeatedly cast from a flowable clay slurry a generally smooth ceramic glove dipping form having a plurality of predetermined roughened surface areas on the surface of said glove dipping form corresponding to the gripping non-slip surface portions of the glove to be made on said glove dipping form, which method comprises making a replica of the glove dipping form to be cast in the master mold by first constructing a basic form of substantially the size and shape of the said glove dipping form and having a generally smooth exterior surface; then molding a plurality of thin plastic sheet patches, each patch being smooth on one side and having a molded roughened pattern on the other side and each patch being molded to a size and shape of the respective predetermined surface area of the basic form to which it is to be attached; attaching each of the premolded patches to its respective predetermined area of the generally smooth exterior surface of the basic form with the smooth side of the patch in adhesive contact with the said smooth surface of the basic form to complete the replica; thereafter applying to the replica a surface coating of a flowable self-setting slurry of a composition of the type which sets to a porous, air- and water-pervious solid; then casting around the coated basic form from the same self-setting slurry used for said surface coating a porous air- and water-pervious water-absorbent solid to form a master casting mold; and removing the said replica from the casting mold thus produced; whereby a porous, air- and water-pervious, water-absorbent master casting mold is produced in which may be cast a plurality of ceramic glove dipping forms having the said predetermined roughened surface areas.

References Cited in the file of this patent

UNITED STATES PATENTS

| | | |
|---|---|---|
| 1,336,180 | Allen et al. | Apr. 6, 1920 |
| 1,757,450 | Copeman | May 6, 1930 |
| 1,768,546 | Curtis | July 1, 1930 |
| 2,288,840 | Raiche | July 7, 1942 |
| 2,324,990 | Carter | July 20, 1943 |
| 2,476,726 | Haas | July 19, 1949 |
| 2,581,248 | Ganz | Jan. 1, 1952 |
| 2,659,970 | Ingersoll | Nov. 24, 1953 |